United States Patent
Ho et al.

(10) Patent No.: US 11,366,551 B1
(45) Date of Patent: Jun. 21, 2022

(54) TOUCH MODULE

(71) Applicant: Chicony Power Technology Co., Ltd., New Taipei (TW)

(72) Inventors: Hsuan-Wei Ho, New Taipei (TW); Chen-Hao Chiu, New Taipei (TW); Tsung-Hsun Chen, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 17/305,799

(22) Filed: Jul. 14, 2021

(30) Foreign Application Priority Data

Mar. 9, 2021 (TW) .................................. 110108394

(51) Int. Cl.
*G06F 3/042* (2006.01)
*G06F 3/041* (2006.01)

(52) U.S. Cl.
CPC .......... *G06F 3/0421* (2013.01); *G06F 3/0426* (2013.01); *G06F 3/04164* (2019.05)

(58) Field of Classification Search
CPC .. G02B 6/006; H01H 13/83; H01H 2219/064; H01H 13/023; H01H 2219/036; H01H 2219/037; H01H 2219/046; H01H 2219/048; H01H 19/025; H01H 2223/054; H01H 2223/03; H01H 2203/052; H01H 2219/014; H01H 2219/016; H01H 2219/026; G06F 3/0421; G06F 3/042; G06F 2203/04109; G06F 3/0238; G06F 3/0423; G06F 3/0428; G09F 13/18; G09F 9/33; G09F 13/22; G09F 2013/222; G02F 1/13338; H04M 1/22

See application file for complete search history.

(56) References Cited

U.S. PATENT DOCUMENTS

| | | | | |
|---|---|---|---|---|
| 2010/0137033 A1* | 6/2010 | Lee | ....................... | G06F 1/1616 345/173 |
| 2010/0271839 A1* | 10/2010 | Chan | ..................... | H01H 13/83 362/602 |
| 2020/0178365 A1 | 6/2020 | Lin | | |

FOREIGN PATENT DOCUMENTS

| | | |
|---|---|---|
| CN | 110658933 A | 1/2020 |
| CN | 110749157 A | 2/2020 |
| TW | 200905530 A | 2/2009 |
| TW | 201020886 A | 6/2010 |
| TW | M555059 U | 2/2018 |
| TW | 201810329 A | 3/2018 |

(Continued)

*Primary Examiner* — Koosha Sharifi-Tafreshi
(74) *Attorney, Agent, or Firm* — Innovation Capital Law Group, LLP; Vic Lin (57) ABSTRACT

A touch module includes a circuit board, a light emitting element, a light guide plate, and a reflector plate. The light emitting element is electrically connected to the circuit board, and the light emitting element has an upper light emitting surface. The light guide plate is arranged above the circuit board. The reflector plate is arranged above the light guide plate. The reflector plate includes a first surface facing the light guide plate. The first surface is provided with a light-transmitting region, a light-shielding region, and a light-reflecting region. The light-reflecting region is arranged corresponding to the light emitting element. An area of the light-shielding region is greater than an area of the light-reflecting region. The area of the light-reflecting region is greater than an area of the upper light emitting surface of the light emitting element.

12 Claims, 7 Drawing Sheets

(56) References Cited

FOREIGN PATENT DOCUMENTS

| TW | 201901723 A | 1/2019 |
|----|-------------|--------|
| TW | I661346 B   | 6/2019 |
| TW | 202013170 A | 4/2020 |

* cited by examiner

TOUCH MODULE

CROSS-REFERENCE TO RELATED APPLICATION

This non-provisional application claims priority under 35 U.S.C. § 119(a) to Patent Application No. 110108394 filed in Taiwan, R.O.C. on Mar. 9, 2021, the entire contents of which are hereby incorporated by reference.

BACKGROUND

Technical Field

The present invention relates to a touch module, and in particular, to a light emitting touch module.

Related Art

Generally speaking, a chip scale package light emitting diode (CSP LED) cannot directly place a light source under a pattern to emit light during use due to having a wide light emitting angle. Otherwise, a problem of excessive light sources of the pattern may be caused, and brightness cannot be adjusted by means of a light guide plate, resulting in an incapability of optimization of lighting effects.

SUMMARY

In view of this, according to some embodiments, a touch module includes a circuit board, a first light emitting element, a second light emitting element, a light guide plate, and a reflector plate. The first light emitting element and the second light emitting element are electrically connected to the circuit board, and the first light emitting element and the second light emitting element respectively have a first upper light emitting surface and a second upper light emitting surface. The light guide plate is arranged above the circuit board. The reflector plate is arranged above the light guide plate. The reflector plate includes a first surface. The first surface faces the light guide plate and is provided with a light-transmitting region, a light-shielding region, a first light-reflecting region, and a second light-reflecting region. The light-transmitting region allows light to transmit through, and the light-shielding region prevents the light from transmitting through. The first light-reflecting region and the second light-reflecting region reflect the light back to the light guide plate, and the first light-reflecting region and the second light-reflecting region are respectively arranged corresponding to the first light emitting element and the second light emitting element. An area of the light-shielding region is greater than an area of the first light-reflecting region or an area of the second light-reflecting region, and the area of the first light-reflecting region and the area of the second light-reflecting region are respectively greater than an area of the first upper light emitting surface and an area of the second upper light emitting surface.

In some embodiments, the reflector plate has a virtual axis thereon that passes through a center of the light-transmitting region, and the first light emitting element and the second light emitting element are arranged on both sides of the virtual axis.

In some embodiments, the light guide plate has a light emitting region that is arranged corresponding to the light-transmitting region, and the light emitting region has a first sub-region, a second sub-region, a third sub-region, a fourth sub-region, a fifth sub-region, a sixth sub-region, a seventh sub-region, an eighth sub-region, and a ninth sub-region. The first sub-region, the second sub-region, and the third sub-region are located in a first row, the fourth sub-region, the fifth sub-region, and the sixth sub-region are located in a second row, the seventh sub-region, the eighth sub-region, and the ninth sub-region are located in a third row, the first sub-region, the fourth sub-region, and the seventh sub-region are located in a first column, and the second sub-region, the fifth sub-region, and the eighth sub-region are located in a second column, and the third sub-region, the sixth sub-region, and the ninth sub-region are located in a third column.

In some embodiments, the first light emitting element and the second light emitting element are arranged on the same side corresponding to the light emitting region, the second sub-region has a first microstructures, the seventh sub-region and the ninth sub-region have second microstructures, and a number or a total area of the first microstructure is less than a number or a total area of the second microstructures.

In some embodiments, the first light emitting element and the second light emitting element are respectively arranged on two opposite sides of the corresponding light emitting region, the second sub-region and the eighth sub-region have first microstructures, and the first column and the third column have second microstructures. A number or a total area of the first microstructures is less than a number or a total area of the second microstructures.

In some embodiments, the first light emitting element and the second light emitting element are arranged adjacent to two diagonal corners corresponding to the light emitting region, and the light emitting region does not have first microstructures and has only second microstructures that is uniformly distributed.

According to some embodiments, a touch module includes a circuit board, a light emitting element, a light guide plate, and a reflector plate. The light emitting element is electrically connected to the circuit board, and the light emitting element has an upper light emitting surface. The light guide plate is arranged above the circuit board. The reflector plate is arranged above the light guide plate. The reflector plate includes a first surface facing the light guide plate. The first surface is provided with a light-transmitting region, a light-shielding region, and a light-reflecting region. The light-transmitting region allows light to transmit through, the light-shielding region prevents the light from transmitting through, the light-reflecting region reflects the light back to the light guide plate, and the light-reflecting region is arranged corresponding to the light emitting element. An area of the light-shielding region is greater than the area of the light-reflecting region, and the area of the light-reflecting region is greater than an area of the upper light emitting surface.

In some embodiments, the reflector plate has a virtual axis thereon that passes through a center of the light-transmitting region.

In some embodiments, the light emitting element is arranged on a side corresponding to the light emitting region that is adjacent to the second sub-region, the second sub-region has first microstructure, and the seventh sub-region and the ninth sub-region have second microstructures. A number or a total area of the first microstructures is less than a number or a total area of the second microstructures.

In some embodiments, the light emitting element is arranged on a side corresponding to the light emitting region that is adjacent to the first sub-region, the first sub-region has a first microstructures, and the third sub-region and the sixth sub-region have second microstructures. A number or a total area of the first microstructures is less than a number or a total area of the second microstructures.

In some embodiments, the light emitting element is arranged at a diagonal corner corresponding to the light emitting region that is adjacent to the first sub-region, the first sub-region has first microstructures, and the third column has second microstructures. A number or a total area of the first microstructures is less than a number or a total area of the second microstructures.

Based on the above, according to the touch module of some embodiments, energy of the light source is dispersed by means of the reflector plate, so that the light source can enter the light guide plate and can be transmitted, and a configuration of grid points is combined with a change in a distance between the light source and a pattern to achieve optimization of lighting effects.

DETAILED DESCRIPTION

Figure 1:
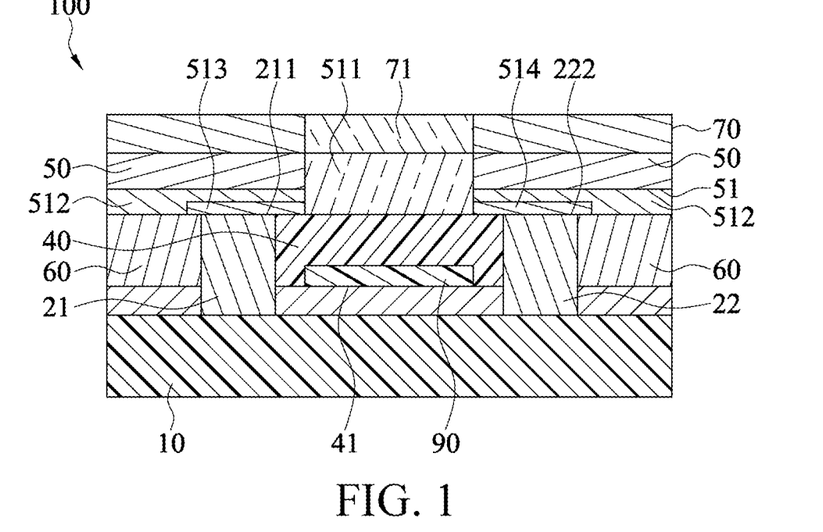
FIG. 1 is a schematic diagram of a structure of a touch module according to a first embodiment.
Figure 2:
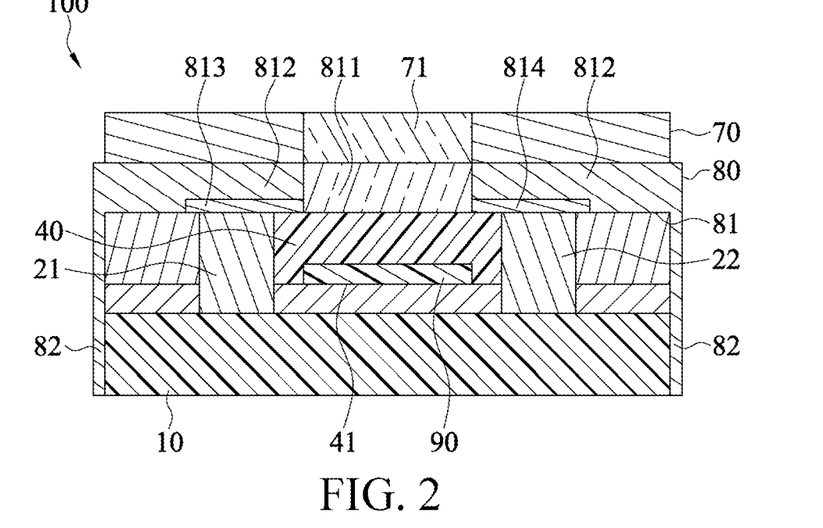
FIG. 2 is a schematic diagram of the structure of the touch module according to another embodiment.
Figure 3:
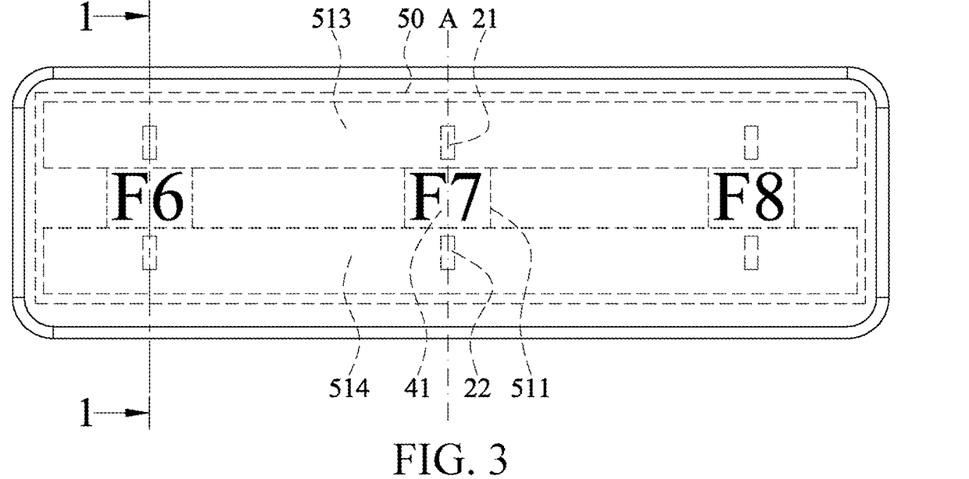
FIG. 3 is an application diagram of the structure of the touch module according to a first embodiment.

Referring to FIG. 1, FIG. 2, and FIG. 3. FIG. 1 is a schematic diagram of a structure of a touch module according to a first embodiment. FIG. 2 is a schematic diagram of the structure of the touch module according to another embodiment. FIG. 3 is an application diagram of the structure of the touch module according to a first embodiment. As shown in FIG. 1 and FIG. 2, a touch module 100 includes a circuit board 10, a first light emitting element 21, a second light emitting element 22, a light guide plate 40, and a reflector plate 50.

As shown in FIG. 3, the touch module 100 may be applied to, for example, a keyboard or a touch panel of a notebook computer. In a normal mode, the touch module 100 may be used for controlling a mouse pointer. In a light emitting mode, the touch module 100 may display a specific pattern, for example, a number, an English symbol, or an operational symbol, for a user to perform a calculation or input a message. As shown in FIG. 3, in the first embodiment, the touch module 100 has a strip-shaped structure and is applied to the touch panel of the notebook computer. The strip-shaped structure of the touch module 100 is only an example. The corresponding shape and structure may also be designed according to an arrangement of keys.

As shown in FIG. 1, the first light emitting element 21 and the second light emitting element 22 are electrically connected to the circuit board 10. In this embodiment, the light emitting element is, for example, a CSP LED, but the present invention is not limited thereto. The CSP LED is a chip-scale packaged LED device, which has a small size and facilitates disposing of a crowded space in the touch module. Two light emitting elements are used as an example herein, but the present invention is not limited thereto. According to the size of the touch module, a number of light emitting elements to be used may also be adjusted.

The light guide plate 40 is arranged above the circuit board 10. The light guide plate 40 is arranged between the first light emitting element 21 and the second light emitting element 22. The reflector plate 50 is arranged above the light guide plate 40. In this embodiment, the first light emitting element 21 and the second light emitting element 22 respectively have a first upper light emitting surface 211 and a second upper light emitting surface 222. In other words, the first upper light emitting surface 211 and the second upper light emitting surface 222 are surfaces of the first light emitting element 21 and the second light emitting element 22 facing the reflector plate 50.

In this embodiment, the reflector plate 50 includes a first surface 51, and the first surface 51 is a surface facing the light guide plate 40. The reflector plate 50 is made of a transparent and light-transmitting material, for example, but not limited to polyethylene terephthalate. The first surface 51 of the reflector plate 50 is provided with a light-transmitting region 511, a light-shielding region 512, a first light-reflecting region 513, and a second light-reflecting region 514. The light-transmitting region 511 may allow light generated by the first light emitting element 21 and the second light emitting element 22 to transmit through. The light-shielding region 512 prevent the light generated by the first light emitting element 21 and the second light emitting element 22 from transmitting. The light-shielding region 512 is, for example, formed through printing by using a light-shielding ink layer. The first light-reflecting region 513 and the second light-reflecting region 514 reflect the light generated by the first light emitting element 21 and the second light emitting element 22 back to the light guide plate 40. The first light-reflecting region 513 and the second light-reflecting region 514 are, for example, formed through printing by using a white ink layer. Specifically, a black light-shielding ink layer is first printed on the first surface 51 of the reflector plate 50 to form the light-shielding region 512, a partially transparent light-transmitting region 511 remains, and then a white light-reflecting ink layer is printed on a part of the black light-shielding ink layer to form the first light-reflecting region 513 and the second light-reflecting region 514.

The first light-reflecting region 513 and the second light-reflecting region 514 are respectively arranged corresponding to the first light emitting element 21 and the second light emitting element 22. The first light-reflecting region 513 roughly covers a path between the first light emitting element 21 and the light-transmitting region 511. The second light-reflecting region 514 roughly covers a path between the second light emitting element 22 and the light-transmitting region 511.

Referring again to FIG. 1, an area of the light-shielding region 512 is greater than an area of the light-transmitting region 511, but the present invention is not limited thereto. The area of the light-shielding region 512 is greater than an area of the first light-reflecting region 513 or an area of the second light-reflecting region 514. The area of the first light-reflecting region 513 and the area of the second light-reflecting region 514 are respectively greater than the area of the first upper light emitting surface 211 and the area of the second upper light emitting surface 222.

Specifically, a size of the light emitting element is minimized to save the use space in the touch module 100. The first light-reflecting region 513 and the second light-reflecting region 514 respectively cover the first upper light emitting surface 211 and the second upper light emitting surface 222. The reflector plate 50 disperses and reflects a light energy generated by the light emitting element to the light guide plate 40 and transmits the light energy to the light-transmitting region 511 to achieve the optimization of lighting effects.

In this embodiment, the touch module 100 further includes a retaining wall 60. The retaining wall 60 is arranged on the circuit board 10 and surrounds a periphery of the circuit board 10 to prevent the light generated by the light emitting element from leaking out. In addition, although not shown in the drawings, in order to prevent light blooming, a baffle is provided between the light emitting regions 41 to prevent the light from the light emitting elements between the regions from affecting each other.

In this embodiment, the touch module 100 may further include a cover plate 70. The cover plate 70 is arranged above the reflector plate 50, the cover plate 70 is provided with a character region 71 corresponding to the light-transmitting region 511, so that a pattern to be displayed can be displayed. The cover plate 70 may be made of, for example, glass, but the present invention is not limited thereto. The reflector plate 50 and the cover plate 70 may be each an independent assembly, or may be integrally formed.

As shown in FIG. 2, in another implementation, the reflector plate 80 can increase the effect of shielding light by virtue of a design of a covered edge. In this embodiment, the reflector plate 80 includes a first surface 81, and the first surface 81 is a surface facing a side of the light guide plate 40. The first surface 81 is provided with a light-transmitting region 811, a light-shielding region 812, a first light-reflecting region 813, and a second light-reflecting region 814. The same parts of the structural configuration of the light-transmitting region 811, the light-shielding region 812, the first light-reflecting region 813, and the second light-reflecting region 814 as the above embodiments are not described again. The reflector plate 80 further includes a wall plate 82. A peripheral of the wall plate 82 to the reflector plate 80 extends toward a side of the light guide plate 40 and encapsulates the light guide plate 40 and the circuit board 10, and the wall plate 82 is printed with a light-shielding ink layer to improve shading effects of the touch module 100.

Referring to FIG. 1 again, according to the first embodiment, the light guide plate 40 is provided with a light emitting region 41 at a position corresponding to the light-transmitting region 511, and the light emitting region 41 has microstructures 90. As the first light emitting element 21 and the second light emitting element 22 are at different positions, the microstructures 90 have different interval configurations. For example, in a darker region, the microstructures 90 are arranged at relatively small intervals, and in a brighter region, the microstructures 90 are arranged at relatively large intervals. This configuration can effectively reduce the problem of graininess of the pattern after being lightened by light. Various different implementations are provided regarding the configuration between the microstructures 90 and the light emitting element (detailed later).

Figure 4:
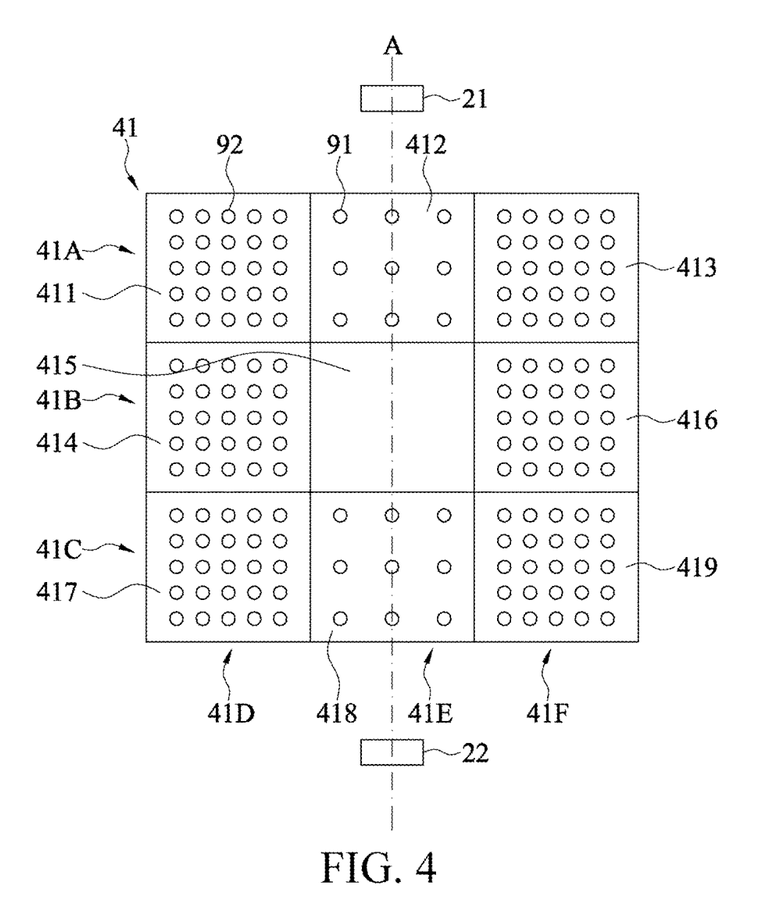
FIG. 4 is a schematic diagram of a configuration of light emitting elements and grid points according to a first embodiment.

Referring to FIG. 4, FIG. 4 is a schematic diagram of a configuration of light emitting elements and grid points according to a first embodiment. In this embodiment, a light guide plate 40 has a light emitting region 41 that is arranged corresponding to a light-transmitting region 511. The light emitting region 41 has a first sub-region 411, a second sub-region 412, a third sub-region 413, a fourth sub-region 414, a fifth sub-region 415, a sixth sub-region 416, a seventh sub-region 417, an eighth sub-region 418, and a ninth sub-region 419. The first sub-region 411, the second sub-region 412, and the third sub-region 413 are located in a first row 41A. The fourth sub-region 414, the fifth sub-region 415, and the sixth sub-region 416 are located in a second row 41B. The seventh sub-region 417, the eighth sub-region 418, and the ninth sub-region 419 are located in a third row 41C. The first sub-region 411, the fourth sub-region 414, and the seventh sub-region 417 are located in a first column 41D. The second sub-region 412, the fifth sub-region 415, and the eighth sub-region 418 are located in a second column 41E. The third sub-region 413, the sixth sub-region 416, and the ninth sub-region 419 are located in a third column 41F. Specifically, the sub-regions form a nine-square lattice structure. The first row 41A, the second row 41B, and the third row 41C are parallel to each other, and the first column 41D, the second column 41E, and the third column 41F are parallel to each other and orthogonal to the first row 41A, the second row 41B, and the third row 41C.

Various different implementations are provided regarding the configuration between the microstructures 90 and the light emitting element. Referring to FIG. 4 and FIG. 3 together, in the first embodiment, the reflector plate 50 has a virtual axis A thereon that passes through a center of the light emitting region 41, and the first light emitting element 21 and the second light emitting element 22 are arranged on both sides of the virtual axis A. The virtual axis A is orthogonal to each of the rows 41A, 41B, 41C and passes through the center of the light emitting region 41. When the first light emitting element 21 and the second light emitting element 22 are respectively arranged on two opposite sides of the light emitting region 41, the second sub-region 412 and the eighth sub-region 418 have first microstructures 91, and the first column 41D and the third column 41F have second microstructures 92. A number of grid points or a total area of the grid points of the first microstructures 91 is less than a number of grid points or a total area of the grid points of the second microstructures 92. Specifically, as shown in FIG. 4, when the first light emitting element 21 and the second light emitting element 22 are arranged on two opposite sides, the first light emitting element 21 is adjacent to the second sub-region 412, and the second light emitting element 22 is adjacent to the eighth sub-region 418, so that the light is concentrated at the center of the light emitting region 41. However, the second sub-region 412 and the eighth sub-region 418 have relatively strong light energy, and the light energy of the first column 41D and the third column 41F is relatively weak. Therefore, the second sub-region 412 and the eighth sub-region 418 are provided with first microstructures 91 with relatively scattered grid points, and the first column 41D and the third column 41F are provided with second microstructures 92 with relatively close grid points. In other words, the first microstructures 91 provided in the second sub-region 412 and the eighth sub-region 418 are arranged with grid points at relatively large intervals, and the second microstructures 92 provided in the first column 41D and the third column 41F are arranged with grid points at relatively small intervals. As a result, the number of grid points or the total area of the grid points of the first microstructures 91 is less than the number of grid points or the total area of the grid points of the second microstructures 92. Spaced arrangement of the grid points of the microstructures 90 varies with intensity of light. Although the fifth sub-region 415 is not configured with the first microstructures 91 or the second microstructures 92 in the first embodiment, this is only a minimal configuration. The microstructures 90 with grid points arranged at different intervals may also be configured according to the intensity of light in the fifth sub-region 415.

Figure 5:
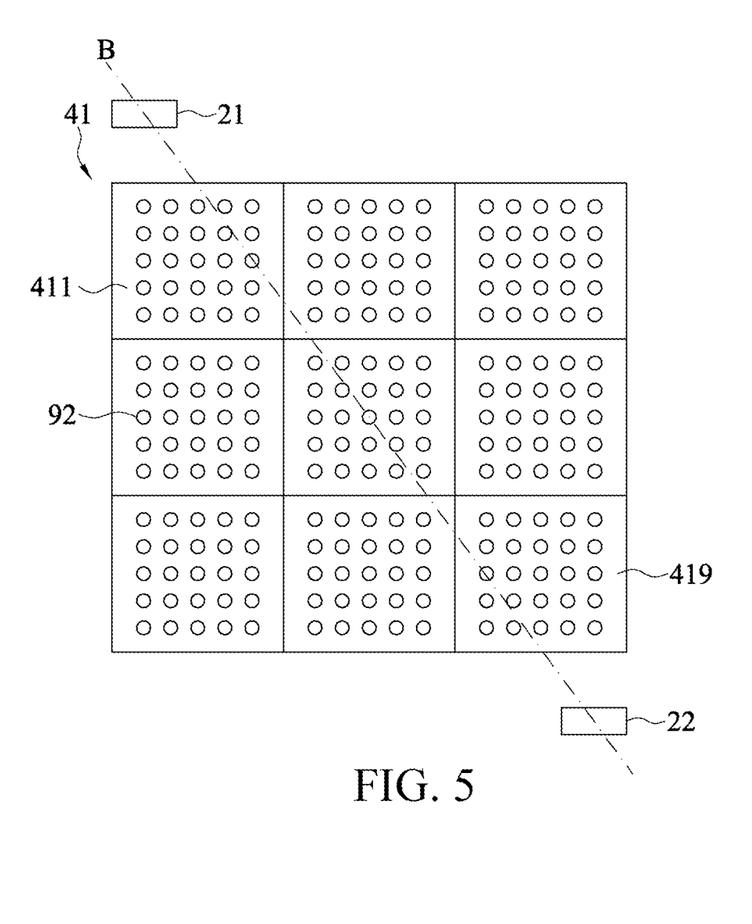
FIG. 5 is a schematic diagram of a configuration of light emitting elements and grid points according to a second embodiment.

Referring to FIG. 5, FIG. 5 is a schematic diagram of a configuration of light emitting elements and grid points according to a second embodiment. The same elements and structures of the following embodiments as those of the above embodiments are not described again. In the second embodiment, the reflector plate 50 has a virtual axis B thereon that passes through a center of a light-transmitting region 511, and a first light emitting element 21 and a second light emitting element 22 are arranged on both sides of the virtual axis B. The virtual axis B passes through the center of the light-transmitting region 511 in a diagonal manner. The first light emitting element 21 and the second light emitting element 22 are arranged adjacent to two diagonal corners corresponding to the light emitting region 41. The light emitting region 41 does not have first microstructures 91 and has only second microstructures 92 that is uniformly distributed. Specifically, as shown in FIG. 5, when the first light emitting element 21 and the second light emitting element 22 are arranged adjacent to two diagonal corners, the first light emitting element 21 is adjacent to the first sub-region 411, and the second light emitting element 22 is adjacent to the ninth sub-region 419, so that the light is uniformly dispersed in the light emitting region 41, and since the light is uniformly and weakly dispersed in the light emitting region 41, the entire light emitting region 41 is provided with second microstructures 92 with relatively close grid points instead of being provided with the first microstructures 91 with relatively scattered grid points. In other words, the second microstructures 92 of the light emitting region 41 is arranged with grid points at relatively small intervals. Spaced arrangement of grid points the microstructures 90 varies with intensity of the light. For example, in the second embodiment, since the light is uniformly and weakly dispersed, the entire light emitting region 41 is configured with the second microstructures 92 with relatively close grid points, but the present invention is not limited thereto. When the light energy of the light emitting element increases, and the brightness of the entire light emitting region 41 increases, the light emitting region 41 is configured with the first microstructures 91 with relatively scattered grid points, or the microstructures 90 with grid points arranged at different intervals is configured according to the intensity of the light.

Figure 6:
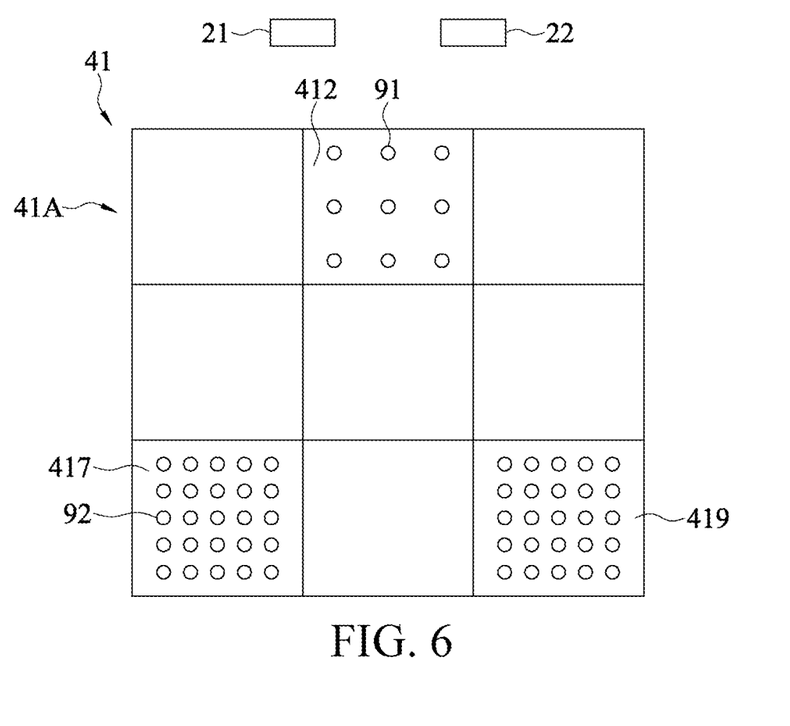
FIG. 6 is a schematic diagram of a configuration of light emitting elements and grid points according to a third embodiment.

Referring to FIG. 6, FIG. 6 is a schematic diagram of a configuration of light emitting elements and grid points according to a third embodiment. In the third embodiment, the first light emitting element 21 and the second light emitting element 22 are arranged on the same side corresponding to the light emitting region 41, the second sub-region 412 has the first microstructures 91, and the seventh sub-region 417 and the ninth sub-region 419 have second microstructures 92. A number of grid points or a total area of the grid points of the first microstructures 91 is less than a number of grid points or a total area of the grid points of the second microstructures 92. Specifically, the first light emitting element 21 and the second light emitting element 22 are arranged on the same side adjacent to the first row 41A, so that the light is concentrated in the second sub-region 412. However, the light in the seventh sub-region 417 and the ninth sub-region 419 is relatively weak, and therefore the second sub-region 412 is provided with the first microstructures 91 with relatively scattered grid points, and the seventh sub-region 417 and the ninth sub-region 419 are provided with the second microstructures 92 with relatively close grid points. In other words, the first microstructures 91 provided in the second sub-region 412 is arranged with grid points at relatively large intervals, and the second microstructures 92 provided in the seventh sub-region 417 and the ninth sub-region 419 are arranged with grid points at relatively small intervals. Therefore, the number of the grid points or the total area of the grid points of the first microstructures 91 is less than the number of the grid points or the total area of the grid points of the second microstructures 92. For example, in the third embodiment, since spaced arrangement of the grid points of the microstructures 90 varies with the intensity of the light, although the first sub-region 411, the third sub-region 413, the second row 41B, and the eighth sub-region 418 are not configured with the first microstructures 91 or the second microstructures 92, the present invention is not limited thereto. According to the light distribution, the microstructures 90 with grid points at different intervals may also be arranged in each of the sub-regions.

Figure 7:
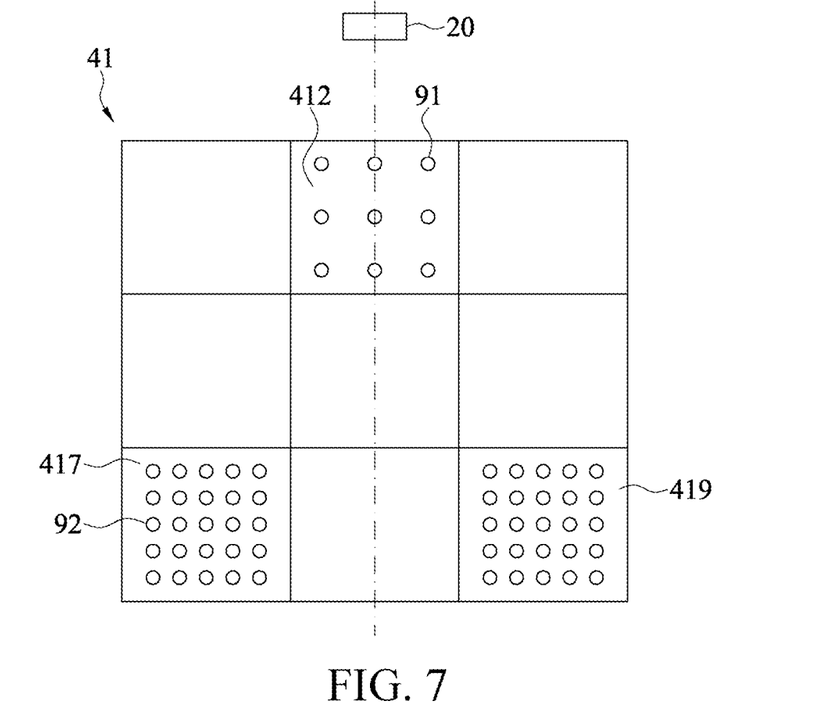
FIG. 7 is a schematic diagram of a configuration of light emitting elements and grid points according to a fourth embodiment.
Figure 7A:
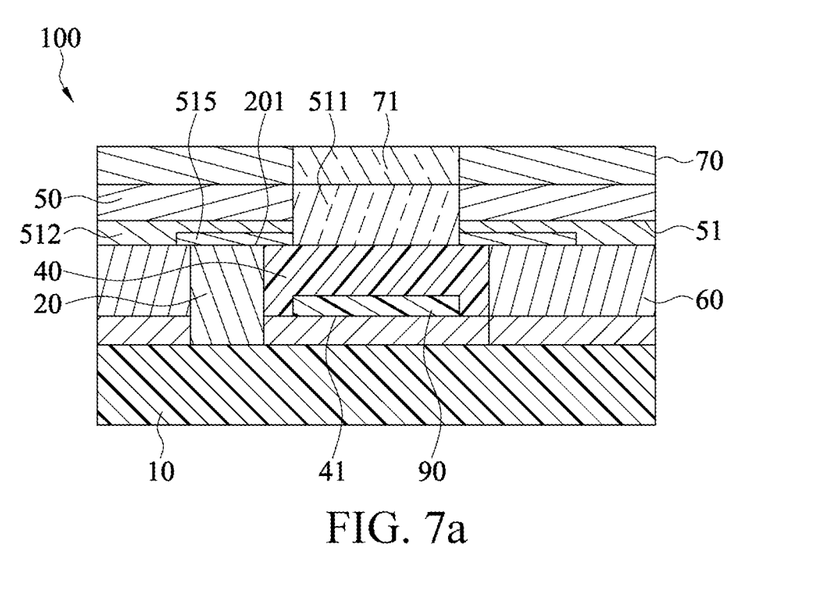
FIG. 7a is a schematic diagram of the structure of the touch module according to a fourth embodiment.

Referring to FIG. 7 and FIG. 7a, FIG. 7 is a schematic diagram of a configuration of light emitting elements and grid points according to a fourth embodiment. FIG. 7a is a schematic diagram of the structure of the touch module according to a fourth embodiment. In the fourth embodiment, only one light emitting element is provided, which is represented by the light emitting element 20 in the following description. The light emitting element 20 includes an upper light emitting surface 201, and the reflector plate 50 is provided with a light-reflecting region 515 corresponding to the light emitting element 20. The rest of the elements and structures that are the same as those in the above embodiment are not described again. The reflector plate 50 has a virtual axis C thereon that passes through a center of the light-transmitting region 511, and the light emitting element 20 is arranged at an end of the virtual axis C. The light emitting element 20 is arranged on a side of the light emitting region 41 adjacent to the second sub-region 412, the second sub-region 412 has first microstructures 91, and the seventh sub-region 417 and the ninth sub-region 419 have second microstructures 92. A number of grid points or a total area of the grid points of the first microstructures 91 is less than a number of grid points or a total area of the grid points of the second microstructures 92. Specifically, the light emitting element 20 is arranged adjacent to the second sub-region 412, so that the light is concentrated in the second sub-region 412. However, the light in the seventh sub-region 417 and the ninth sub-region 419 is relatively weak, and therefore the second sub-region 412 is provided with a first microstructures 91 with relatively scattered grid points, and the seventh sub-region 417 and the ninth sub-region 419 are provided with second microstructures 92 with relatively close grid points. In other words, the first microstructures 91 provided in the second sub-region 412 are arranged with grid points at relatively large intervals, and the second microstructures 92 provided in the seventh sub-region 417 and the ninth sub-region 419 are arranged with grid points at relatively small intervals. Therefore, the number of the grid points or the total area of the grid points of the first microstructures 91 is less than the number of the grid points or the total area of the grid points of the second microstructures 92. For example, in the fourth embodiment, since spaced arrangement of the grid points of the microstructures 90 varies with the intensity of the light, although the first sub-region 411, the third sub-region 413, the second row 41B, and the eighth sub-region 418 are not configured with the first microstructures 91 or the second microstructures 92, the present invention is not limited thereto. According to the light distribution, the microstructures 90 with grid points at different intervals may also be configured in each of the sub-regions.

Figure 8:
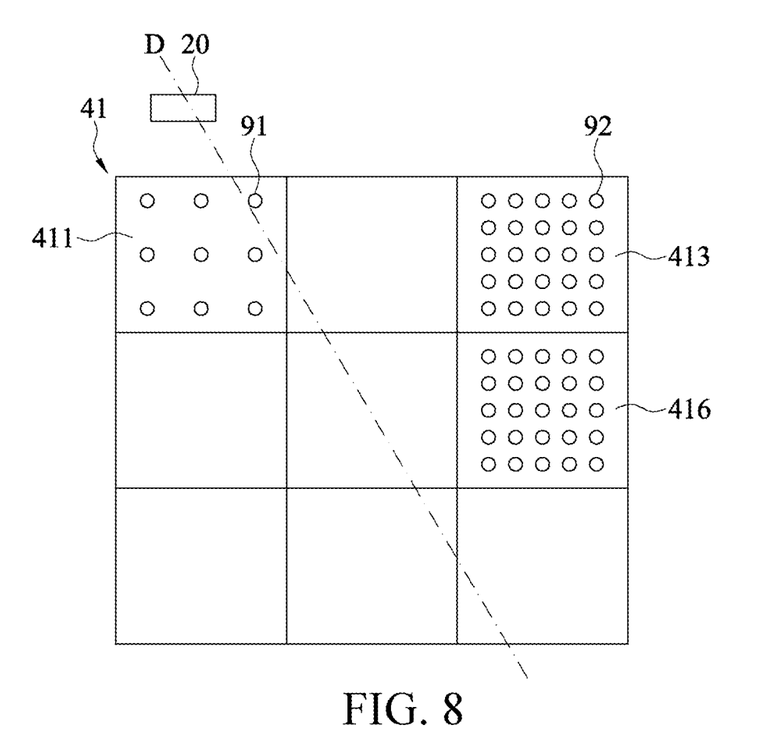
FIG. 8 is a schematic diagram of a configuration of light emitting elements and grid points according to a fifth embodiment.

Referring to FIG. 8, FIG. 8 is a schematic diagram of a configuration of light emitting elements and grid points according to a fifth embodiment. In the fifth embodiment, only one light emitting element is provided. The same partial structural configuration of an embodiment with only one light emitting element below as the above embodiments is not described again. The reflector plate 50 has a virtual axis D thereon that passes through the center of the light-transmitting region 511 in a diagonal manner, and the light emitting element 20 is arranged at an end of the virtual axis D. The light emitting element 20 is arranged on a side corresponding to the light emitting region 41 adjacent to the first sub-region 411, the first sub-region 411 has a first microstructures 91, and the third sub-region 413 and the sixth sub-region 416 have second microstructures 92. A number of grid points or a total area of the grid points of the first microstructures 91 is less than a number of grid points or a total area of the grid points of the second microstructures 92. Specifically, the light emitting element 20 is arranged adjacent to the first sub-region 411, so that the light is concentrated in the first sub-region 411. However, the light in the third sub-region 413 and the sixth sub-region 416 is relatively weak, and therefore the first sub-region 411 is provided with the first microstructures 91 with relatively scattered grid points, and the third sub-region 413 and sixth sub-region 416 are provided with the second microstructures 92 with relatively close grid points. In other words, the first microstructures 91 provided in the first sub-region 411 is arranged with grid points at relatively large intervals, and the second microstructures 92 provided in the third sub-region 413 and the sixth sub-region 416 are arranged with grid points at relatively small intervals. Therefore, the number of grid points or the total area of the grid points of the first microstructures 91 is less than the number of grid points or the total area of the grid points of the second microstructures 92. For example, in the fifth embodiment, since the spaced arrangement of the grid points of the microstructures 90 varies with the intensity of the light, although the second sub-region 412, the fourth sub-region 414, the fifth sub-region 415, and the third row 41C are not configured with the first microstructures 91 or the second microstructures 92, the present invention is not limited thereto. According to the light distribution, the microstructures 90 with grid points at different intervals may also be configured in each of the sub-regions.

Figure 9:
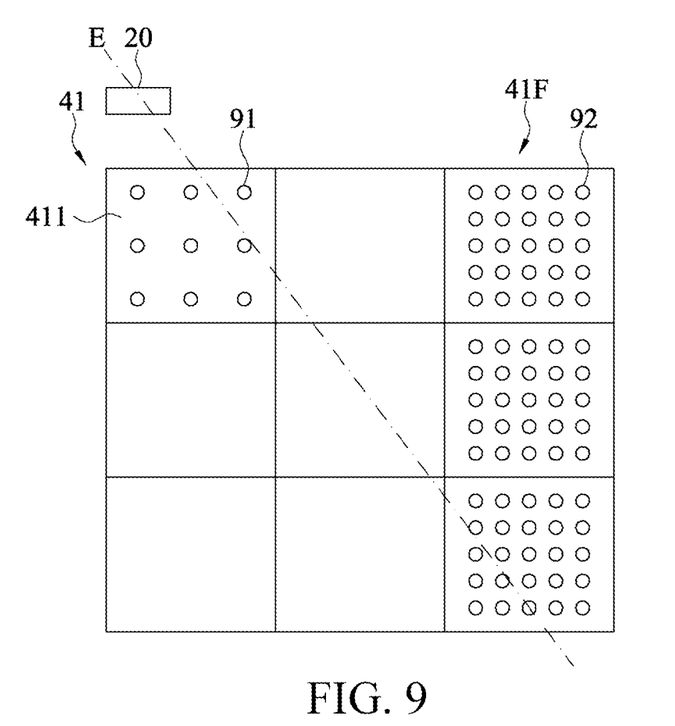
FIG. 9 is a schematic diagram of a configuration of light emitting elements and grid points according to a sixth embodiment.

Referring to FIG. 9, FIG. 9 is a schematic diagram of a configuration of light emitting elements and grid points according to a sixth embodiment. In the sixth embodiment, only one light emitting element is provided. The reflector plate 50 has a virtual axis E thereon that passes through the center of the light-transmitting region 511 in a diagonal manner, and the light emitting element 20 is arranged at an end of the virtual axis E. The light emitting element 20 is arranged at a diagonal corner corresponding to the light emitting region 41 that is adjacent to the first sub-region 411, the first sub-region 411 has a first microstructures 91, and the third column 41F has second microstructures 92. A number or a total area of the grid points of the first microstructures 91 is less than a number of the grid points or a total area of the second microstructures 92. Specifically, the light emitting element 20 is arranged in the diagonal of the light emitting region 41 adjacent to the first sub-region 411, so that the light is concentrated in the first sub-region 411. However, the light in the third column 41F is relatively weak, and therefore the first sub-region 411 is provided with the first microstructures 91 with relatively scattered grid points, and the third column 41F is provided with the second microstructures 92 with relatively close grid points. Stated another way, the first microstructures 91 provided in the first sub-region 411 is arranged with grid points at relatively large intervals, and the second microstructures 92 provided in the third column 41F are arranged with grid points at relatively small intervals. Therefore, the number of grid points or the total area of the grid points of the first microstructures 91 is less than the number of grid points or the total area of the grid points of the second microstructures 92. For example, in the sixth embodiment, since spaced arrangement of the grid points of the microstructures 90 varies with the intensity of the light, although the second sub-region 412, the fourth sub-region 414, the fifth sub-region 415, the seventh sub-region 417, and the eighth sub-region 418 are not configured with the first microstructures 91 or the second microstructures 92, the present invention is not limited thereto. According to the light distribution, the microstructures 90 with grid points at different intervals may also be configured in each of the sub-regions.

Based on the above, the touch module according to some embodiments minimizes the size of the light emitting element to save the use space in the touch module. The light-reflecting region covers the upper light emitting surface. The reflector plate disperses and reflects the light energy generated by the light emitting element to the light guide plate and transmits the light energy to the light-transmitting region, and the light emitting region on the light guide plate is provided with the microstructures. Depending on different positions of the light emitting elements, the microstructures with relatively scattered grid points are arranged at positions with strong light, and the microstructures with relatively close grid points are arranged at positions with weak light, to achieve the optimization of lighting effects.

What is claimed is:

1. A touch module, comprising:
   a circuit board;
   a first light emitting element and a second light emitting element, wherein the first light emitting element and the second light emitting element are electrically connected to the circuit board, and the first light emitting element and the second light emitting element respectively have a first upper light emitting surface and a second upper light emitting surface;
   a light guide plate arranged above the circuit board; and
   a reflector plate arranged above the light guide plate, wherein the reflector plate comprises:
   a first surface facing the light guide plate and provided with a light-transmitting region, a light-shielding region, a first light-reflecting region, and a second light-reflecting region, wherein the light-transmitting region is configured to allow light to transmit through, the light-shielding region is configured to prevent the light from transmitting through, the first light-reflecting region and the second light-reflecting region are configured to reflect the light back to the light guide plate, and the first light-reflecting region and the second light-reflecting region are respectively arranged corresponding to the first light emitting element and the second light emitting element; wherein an area of the light-shielding region is greater than an area of the first light-reflecting region or an area of the second light-reflecting region, and the area of the first light-reflecting region and the area of the second light-reflecting region are respectively greater than an area the first upper light emitting surface and an area of the second upper light emitting surface.

2. The touch module according to claim 1, wherein the reflector plate has a virtual axis thereon that passes through a center of the light-transmitting region, and the first light emitting element and the second light emitting element are arranged on both sides of the virtual axis.

3. The touch module according to claim 2, wherein the light guide plate has a light emitting region arranged corresponding to the light-transmitting region, the light emitting region has a first sub-region, a second sub-region, a third sub-region, and a fourth sub-region, a fifth sub-region, a sixth sub-region, a seventh sub-region, an eighth sub-region, and a ninth sub-region, the first sub-region, the second sub-region, and the third sub-region are located in a first row, the fourth sub-region, the fifth sub-region, and the sixth sub-region are located in a second row, the seventh sub-region, the eighth sub-region, and the ninth sub-region are located in a third row, the first sub-region, the fourth sub-region, and the seventh sub-region are located in a first column, the second sub-region, the fifth sub-region, and the eighth sub-region are located in a second column, and the third sub-region, the sixth sub-region, and the ninth sub-region are located in a third column.

4. The touch module according to claim 3, wherein the first light emitting element and the second light emitting element are arranged on the same side corresponding to the light emitting region, the second sub-region has a first microstructures, the seventh sub-region and the ninth sub-region have second microstructures, and a number or a total area of the first microstructures is less than a number or a total area of the second microstructures.

5. The touch module according to claim 3, wherein the first light emitting element and the second light emitting element are arranged on two opposite sides corresponding to the light emitting region, the second sub-region and the eighth sub-region have first microstructures, the first column and the third column have second microstructures, and a number or a total area of the first microstructures is less than a number or a total area of the second microstructures.

6. The touch module according to claim 3, wherein the first light emitting element and the second light emitting element are arranged adjacent to two diagonal corners corresponding to the light emitting region, and the light emitting region does not have a first microstructures and has only a second microstructures that are uniformly distributed.

7. A touch module, comprising:
a circuit board;
a light emitting element electrically connected to the circuit board, wherein the light emitting element has an upper light emitting surface;
a light guide plate arranged above the circuit board; and
a reflector plate arranged above the light guide plate, wherein the reflector plate comprises:
a surface facing the light guide plate and provided with a light-transmitting region, a light-shielding region, a light-reflecting region, wherein the light-transmitting region is configured to allow light to transmit through, the light-shielding region is configured to prevent the light from transmitting through, the light-reflecting region is configured to reflect the light back to the light guide plate, and the light-reflecting region is arranged corresponding to the light emitting element; wherein
an area of the light-shielding region is greater than an area of the light-reflecting region, and the area of the light-reflecting region is greater than an area of the upper light emitting surface.

8. The touch module according to claim 7, wherein the reflector plate has a virtual axis thereon that passes through a center of the light-transmitting region.

9. The touch module according to claim 8, wherein the light guide plate has a light emitting region arranged corresponding to the light-transmitting region, the light emitting region has a first sub-region, a second sub-region, a third sub-region, and a fourth sub-region, a fifth sub-region, a sixth sub-region, a seventh sub-region, an eighth sub-region, and a ninth sub-region, the first sub-region, the second sub-region, and the third sub-region are located in a first row, the fourth sub-region, the fifth sub-region, and the sixth sub-region are located in a second row, the seventh sub-region, the eighth sub-region, and the ninth sub-region are located in a third row, the first sub-region, the fourth sub-region, and the seventh sub-region are located in a first column, the second sub-region, the fifth sub-region, and the eighth sub-region are located in a second column, and the third sub-region, the sixth sub-region, and the ninth sub-region are located in a third column.

10. The touch module according to claim 9, wherein the light emitting element is arranged on a side corresponding to the light emitting region that is adjacent to the second sub-region, the second sub-region has a first microstructures, the seventh sub-region and the ninth sub-region have second microstructures, and a number or a total area of the first microstructures is less than a number or a total area of the second microstructures.

11. The touch module according to claim 9, wherein the light emitting element is arranged on a side corresponding to the light emitting region that is adjacent to the first sub-region, the first sub-region has a first microstructures, the third sub-region and the sixth sub-region have second microstructures, and a number or a total area of the first microstructures is less than a number or a total area of the second microstructures.

12. The touch module according to claim 9, wherein the light emitting element is arranged at a diagonal corner corresponding to the light emitting region that is adjacent to the first sub-region, the first sub-region has a first microstructures, the third column has second microstructures, and a number or a total area of the first microstructures is less than a number or a total area of the second microstructures.

* * * * *